United States Patent
Takeuchi (10) Patent No.: US 10,213,668 B2
(45) Date of Patent: Feb. 26, 2019

(54) GOLF CLUB SHAFT

(71) Applicant: DUNLOP SPORTS CO. LTD., Kobe-shi, Hyogo (JP)

(72) Inventor: Hiroyuki Takeuchi, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/669,453

(22) Filed: Aug. 4, 2017

(65) Prior Publication Data

US 2018/0036612 A1 Feb. 8, 2018

(30) Foreign Application Priority Data

Aug. 5, 2016 (JP) .................. 2016-154354

(51) Int. Cl.
| | | |
|---|---|---|
| *A63B 53/10* | (2015.01) | |
| *A63B 60/00* | (2015.01) | |
| *A63B 53/12* | (2015.01) | |
| *G01B 5/00* | (2006.01) | |
| *A63B 60/42* | (2015.01) | |

(52) U.S. Cl.
CPC ............. *A63B 60/00* (2015.10); *A63B 53/10* (2013.01); *A63B 53/12* (2013.01); *A63B 60/42* (2015.10); *G01B 5/0023* (2013.01); *A63B 2060/0081* (2015.10); *A63B 2209/023* (2013.01)

(58) Field of Classification Search
CPC ......... A63B 53/10; A63B 53/12; A63B 60/00; A63B 2060/0081; A63B 2209/023; A63B 60/42; G01B 5/0023
See application file for complete search history.

(56) References Cited

U.S. PATENT DOCUMENTS

| | | | | | |
|---|---|---|---|---|---|
| 4,558,863 | A * | 12/1985 | Haas | ...................... | A63B 53/10 473/289 |
| 5,551,691 | A * | 9/1996 | Harada | .................. | A63B 53/10 473/318 |
| 6,110,056 | A * | 8/2000 | Yamamoto | ............. | A63B 53/00 273/DIG. 23 |
| 6,302,805 | B1 * | 10/2001 | Penley | ................... | A63B 53/10 473/318 |
| 6,872,151 | B2 * | 3/2005 | Oyama | .................. | A63B 53/10 473/319 |
| 6,929,562 | B2 * | 8/2005 | Kumamoto | ............ | A63B 53/10 473/316 |
| 7,048,645 | B2 * | 5/2006 | Kumamoto | ............ | A63B 53/10 473/319 |

(Continued)

*Primary Examiner* — Stephen Blau

(74) *Attorney, Agent, or Firm* — Birch, Stewart, Kolasch & Birch LLP (57) ABSTRACT

A shaft 6 includes a tip end Tp and a butt end Bt. If a shaft length is defined as Ls, a distance between the butt end Bt of the shaft and a center of gravity G of the shaft is defined as Lg, and a ratio of the distance Lg to the shaft length Ls is defined as a ratio of the center of gravity of the shaft, then the ratio of the center of gravity of the shaft is equal to or less than 47%. The shaft length Ls is equal to or less than 991 mm. If a forward flex is defined as F1 (mm) and a backward flex is defined as F2 (mm), a flex point ratio C1 of the shaft calculated by the following formula (1) is equal to or less than 39%:

$$C1 = [F2/(F1+F2)] \times 100 \qquad (1).$$

11 Claims, 4 Drawing Sheets

(56) References Cited

U.S. PATENT DOCUMENTS

| | | | | |
|---|---|---|---|---|
| 7,297,070 | B2 * | 11/2007 | Ashida | A63B 24/0003 |
| | | | | 473/223 |
| 7,338,386 | B2 * | 3/2008 | Nakajima | A63B 53/10 |
| | | | | 473/319 |
| 8,021,244 | B2 * | 9/2011 | Kato | A63B 53/10 |
| | | | | 473/319 |
| 8,574,100 | B2 * | 11/2013 | Hasegawa | A63B 24/0003 |
| | | | | 473/282 |
| 8,678,945 | B2 * | 3/2014 | Rice | A63B 53/10 |
| | | | | 473/292 |
| 8,827,829 | B2 * | 9/2014 | Nakano | A63B 53/10 |
| | | | | 473/319 |
| 8,936,516 | B2 * | 1/2015 | Yashiki | A63B 53/10 |
| | | | | 473/319 |
| 9,295,888 | B2 * | 3/2016 | Fujiwara | A63B 53/10 |
| 2012/0295734 | A1 * | 11/2012 | Hasegawa | A63B 53/10 |
| | | | | 473/319 |
| 2015/0094160 | A1 * | 4/2015 | Nakamura | A63B 60/00 |
| | | | | 473/319 |
| 2016/0346651 | A1 | 12/2016 | Nakamura et al. | |

* cited by examiner

GOLF CLUB SHAFT

The present application claims priority on Patent Application No. 2016-154354 filed in JAPAN on Aug. 5, 2016, the entire contents of which are hereby incorporated by reference.

BACKGROUND OF THE INVENTION

Field of the Invention

The present invention relates to a golf club shaft.

Description of the Related Art

In light of easiness of swing, a shaft having a center of gravity positioned closer to the butt is proposed. Japanese Patent No. 5824592 (US2016/0346651) discloses a wood type golf club having a ratio of a center of gravity of the shaft that is equal to or less than 44.5% and a flex point ratio of the shaft that is equal to or less than 0.50.

SUMMARY OF THE INVENTION

A shaft having a length of 991 mm or less is mainly used for an iron club. The shaft having such a length requires a higher directional stability, as compared with a longer shaft. In this respect, since a conventional shaft for athletes has a great weight and the center of gravity of the shaft is positioned closer to the tip, the shaft has a problem of hardness of swing and low flight distance performance, although the shaft has a high directional stability. Meanwhile, a shaft having a small rigidity at a tip portion thereof has a great launch angle but has low directional stability and thus apt to cause the loss of flight distance. A shaft that can achieve easiness of swing and a flight distance performance in addition to directional stability all at a high level does not exist.

It is an object of the present invention to provide a golf club shaft excellent in directional stability and flight distance performance.

A preferable shaft according to the present invention includes a tip end and a butt end. If a shaft length is defined as Ls, a distance between the butt end of the shaft and a center of gravity of the shaft is defined as Lg, and a ratio of the distance Lg to the shaft length Ls is defined as a ratio of the center of gravity of the shaft, then the ratio of the center of gravity of the shaft is equal to or less than 47%. The shaft length Ls is equal to or less than 991 mm. If a forward flex is defined as F1 (mm), and a backward flex is defined as F2 (mm), a flex point ratio C1 of the shaft calculated by the following formula (1) is equal to or less than 39%.

$$C1=[F2/(F1+F2)]\times 100 \tag{1}$$

Preferably, a shaft weight obtained by a conversion calculation for 991 mm shaft length is equal to or less than 75 g.

Preferably, the tip end has an outer diameter E1 of equal to or less than 9.5 mm. Preferably, the butt end has an outer diameter E2 of equal to or greater than 15.3 mm.

Preferably, the shaft is constituted of a plurality of fiber reinforced layers. Preferably, the fiber reinforced layers include a tip partial layer. Preferably, the tip partial layer includes a high-elastic tip-partial layer having a fiber elastic modulus of equal to or greater than 30 (t/mm$^2$).

Preferably, the shaft length Ls is equal to or greater than 914 mm but equal to or less than 991 mm. If the outer diameter of the tip end is defined as E1 (mm), E1×F2 is preferably equal to or less than 580 mm$^2$.

Preferably, the shaft length Ls is equal to or greater than 914 mm but equal to or less than 991 mm. If the outer diameter of the butt end is defined as E2 (mm), E2×F1 is preferably equal to or greater than 1300 mm$^2$.

DESCRIPTION OF THE PREFERRED EMBODIMENTS

Hereinafter, the present invention will be described in detail based on the preferred embodiments with appropriate references to the accompanying drawings.

The term "layer" and the term "sheet" are used in the present application. The "layer" is termed after being wound. On the other hand, the "sheet" is termed before being wound. The "layer" is formed by winding the "sheet". That is, the wound "sheet" forms the "layer". In the present application, the same reference symbol is used in the layer and the sheet. For example, a layer formed by a sheet s1 is defined as a layer s1.

In the present application, an "inside" means an inside in a radial direction of a shaft. In the present application, an "outside" means an outside in the radial direction of the shaft.

In the present application, an "axis direction" means an axis direction of the shaft.

In the present application, an angle Af and an absolute angle θa are used for the angle of a fiber to the axis direction. The angle Af is a plus or minus angle. The absolute angle θa is the absolute value of the angle Af. In other words, the absolute angle θa is the absolute value of an angle between the axis direction and the direction of the fiber. For example, "the absolute angle θa is equal to or less than 10 degrees" means that "the angle Af is −10 degrees or greater but +10 degrees or less".

Figure 1:
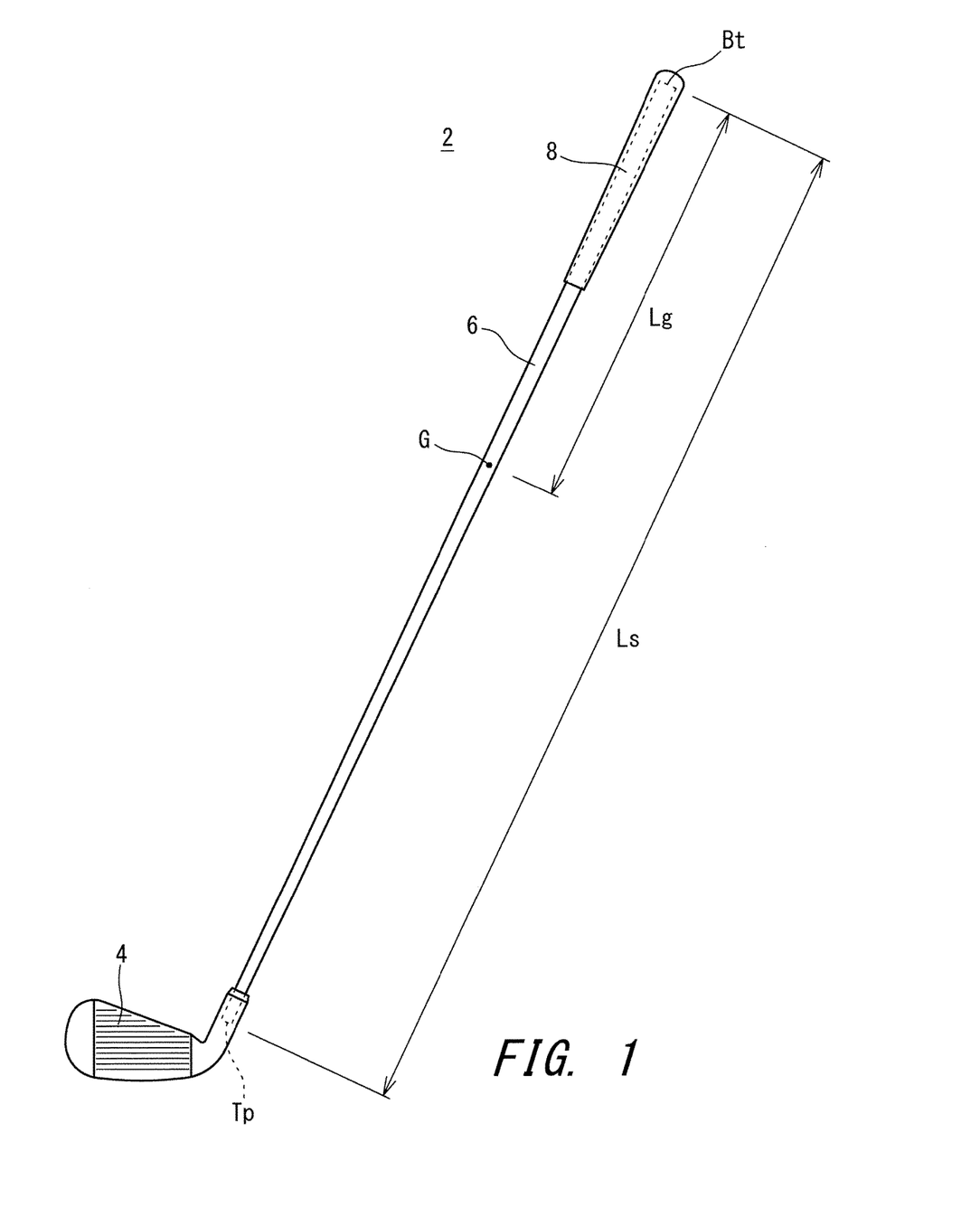
FIG. 1 shows a golf club including a shaft according to a first embodiment of the present invention.

FIG. 1 shows a golf club 2 provided with a golf club shaft 6 according to a first embodiment of the present invention. The golf club 2 is provided with a head 4, a shaft 6, and a grip 8. The head 4 is provided at the tip portion of the shaft 6. The grip 8 is provided at the back end portion of the shaft 6. The head 4 and the grip 8 are not restricted. Examples of the head 4 include a wood type golf club head, a hybrid type golf club head, a utility type golf club head, an iron type golf club head, and a putter head.

The head 4 of the present embodiment is an iron type golf club head. The present invention is effective in a shaft having a length of equal to or less than 991 mm. In this respect, the head 4 is preferably an iron type golf club head and a hybrid type golf club head, and more preferably an iron type golf club head.

The material of the head 4 is not restricted. Examples of the material of the head 4 include titanium, a titanium alloy, CFRP (carbon fiber reinforced plastic), stainless steel, maraging steel, and soft iron. A plurality of materials can be combined. The soft iron, the stainless steel and the titanium alloy are preferable for an iron head.

The shaft 6 includes a laminate of fiber reinforced resin layers. The shaft 6 is a tubular body. The shaft 6 has a hollow structure. As shown in FIG. 1, the shaft 6 has a tip end Tp and a butt end Bt. The tip end Tp is located in the head 4. The butt end Bt is located in the grip 8.

The shaft 6 is a so-called carbon shaft. The shaft 6 is preferably produced by curing a prepreg sheet. In the prepreg sheet, a fiber is oriented substantially in one direction. Thus, the prepreg in which the fiber is oriented substantially in one direction is also referred to as a UD prepreg. The term "UD" stands for uni-direction. Prepregs other than the UD prepreg may be used. For example, fibers contained in the prepreg sheet may be woven.

The prepreg sheet has a fiber and a resin. The resin is also referred to as a matrix resin. The fiber is typically a carbon fiber. A glass fiber is also preferably used. The matrix resin is typically a thermosetting resin.

The shaft 6 is manufactured by a so-called sheet winding method. In the prepreg, the matrix resin is in a semicured state. The shaft 6 is obtained by winding and curing the prepreg sheet. The curing means the curing of the semicured matrix resin. The curing is attained by heating. The manufacturing process of the shaft 6 includes a heating process. The heating process cures the matrix resin of the prepreg sheet.

Figure 2:
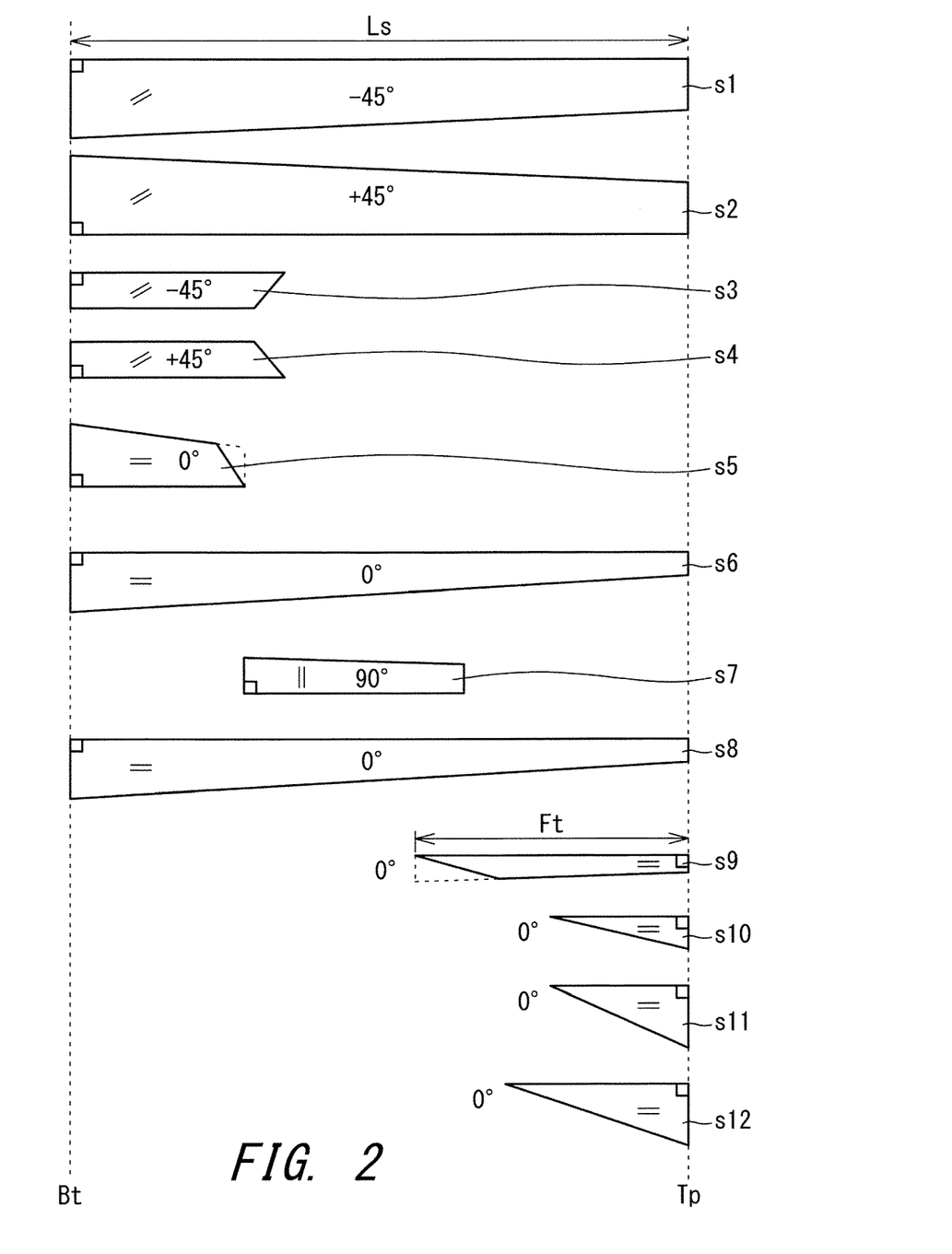
FIG. 2 is a developed view of the shaft according to the first embodiment.

FIG. 2 is a developed view (sheet constitution view) of the prepreg sheets constituting the shaft 6. The shaft 6 includes a plurality of sheets. In the embodiment of FIG. 2, the shaft 6 includes twelve sheets s1 to s12. In the present application, the developed view shown in FIG. 2 or the like shows the sheets constituting the shaft in order from the radial inside of the shaft. The sheets are wound in order from the sheet located above in the developed view. In the developed view of the present application, the horizontal direction of the figure coincides with the axis direction of the shaft. In the developed view of the present application, the right side of the figure is the tip end Tp side of the shaft. In the developed view of the present application, the left side of the figure is the butt end Bt side of the shaft.

The developed view of the present application shows not only the winding order of each of the sheets but also the disposal of each of the sheets in the axis direction of the shaft. For example, in FIG. 2, the ends of the sheets s10 to s12 are located at the tip end Tp. For example, in FIG. 2, the ends of the sheet s3 and the sheet s4 are located at the butt end Bt.

The shaft 6 has a straight layer, a bias layer, and a hoop layer. The orientation angle of the fiber is described in the developed view of the present application. A sheet described as "0°" constitutes the straight layer. The sheet for the straight layer is also referred to as a straight sheet in the present application.

The straight layer is a layer in which the orientation direction of the fiber is substantially 0 degree to the longitudinal direction (axis direction of the shaft) of the shaft. The orientation of the fiber may not be completely set to 0 degree to the axis direction of the shaft by error or the like in winding. Usually, in the straight layer, the absolute angle θa is equal to or less than 10 degrees.

In the embodiment of FIG. 2, the straight sheets are the sheet s5, the sheet s6, the sheet s8, the sheet s9, the sheet s10, the sheet s11, and the sheet s12. The straight layer is highly correlated with the flexural rigidity and flexural strength of the shaft.

On the other hand, the bias layer is highly correlated with the torsional rigidity and torsional strength of the shaft. Preferably, the bias layer includes a pair of sheets in which orientation angles of fibers are inclined in opposite directions to each other. In respect of the torsional rigidity, the absolute angle θa of the bias layer is preferably equal to or greater than 15 degrees, more preferably equal to or greater than 25 degrees, and still more preferably equal to or greater than 40 degrees. In respects of the torsional rigidity and the flexural rigidity, the absolute angle θa of the bias layer is preferably equal to or less than 60 degrees, and more preferably equal to or less than 50 degrees.

The shaft 6 includes a full length bias layer and a partial bias layer. The sheets constituting the full length bias layer are the sheet s1 and the sheet s2. The sheets constituting the partial bias layer are the sheet s3 and the sheet s4. The partial bias layers s3 and s4 are butt partial bias layers.

In FIG. 2, the angle Af is described in each sheet. The plus (+) and minus (−) in the angle Af show that the fibers of bias sheets are inclined in opposite directions to each other. In the present application, the sheet for the bias layer is also merely referred to as the bias sheet.

In the shaft 6, the sheet constituting the hoop layer is the sheet s7. Preferably, the absolute angle θa in the hoop layer is substantially 90 degrees to a shaft axis line. However, the orientation direction of the fiber to the axis direction of the shaft may not be completely set to 90 degrees by error or the like in winding. Usually, in the hoop layer, the absolute angle θa is 80 degrees or greater but 90 degrees or less. In the present application, the prepreg sheet for the hoop layer is also referred to as a hoop sheet.

The hoop layer contributes to enhancement of the crushing rigidity and crushing strength of the shaft. The crushing rigidity is rigidity against a force crushing the shaft toward the inside of the radial direction thereof. The crushing strength is strength against a force crushing the shaft toward the inside of the radial direction thereof. The crushing strength can be also involved with the flexural strength. Crushing deformation can be generated with flexural deformation. In a particularly thin lightweight shaft, this interlocking property is large. The improvement of the crushing strength also can cause the improvement of the flexural strength.

Although not shown in the drawings, the prepreg sheet before being used is sandwiched between cover sheets. The cover sheets are usually a mold release paper and a resin film. That is, the prepreg sheet before being used is sandwiched between the mold release paper and the resin film. The mold release paper is applied to one surface of the prepreg sheet, and the resin film is applied to the other surface of the prepreg sheet. Hereinafter, the surface to which the mold release paper is applied is also referred to as "a surface of a mold release paper side", and the surface to which the resin film is applied is also referred to as "a surface of a film side".

In the developed view of the present application, the surface of the film side is the front side. That is, in the developed view of the present application, the front side of the figure is the surface of the film side, and the back side of the figure is the surface of the mold release paper side. For example, in FIG. 2, the direction of the fiber of the sheet s1 is the same as that of the sheet s2. However, in a stacking process to be described later, the sheet s2 is reversed. As a result, the directions of the fibers of the sheets s1 and s2 are opposite to each other. Therefore, in the state after being wound, the directions of the fibers of the sheets s1 and s2 are opposite to each other. In light of this point, in FIG. 2, the direction of the fiber of the sheet s1 is described as "−45°", and the direction of the fiber of the sheet s2 is described as "+45°". This also holds true for the sheet s3 and the sheet s4.

As described above, in the present application, the sheet and the layer are classified by the orientation angle of the fiber. Furthermore, in the present application, the sheet and the layer are classified by the length of the axis direction of the shaft.

In the present application, a layer disposed all over in the axis direction of the shaft is referred to as a full length layer. In the present application, a sheet disposed all over in the axis direction of the shaft is referred to as a full length sheet. The wound full length sheet forms the full length layer.

On the other hand, in the present application, a layer partially disposed in the axis direction of the shaft is referred to as a partial layer. In the present application, a sheet partially disposed in the axis direction of the shaft is referred to as a partial sheet. The wound partial sheet forms the partial layer.

In the present application, the full length layer which is the straight layer is referred to a full length straight layer. In the embodiment of FIG. 2, the full length straight layers are the sheet s6 and the sheet s8.

In the present application, the full length layer which is the hoop layer is referred to as a full length hoop layer. In the embodiment of FIG. 2, the full length hoop layer does not exist.

In the present application, the partial layer which is the straight layer is referred to a partial straight layer. The embodiment of FIG. 2 includes a butt partial straight layer and tip partial straight layers. The butt partial straight layer is the sheet s5. The tip partial straight layers are the sheet s9, the sheet s10, the sheet s11, and the sheet s12.

In the present application, the partial layer which is the hoop layer is referred to as a partial hoop layer. In the embodiment of FIG. 2, the partial hoop layer is the sheet s7.

The sheet s7 is an intermediate partial layer. The intermediate partial layer is disposed apart from the tip end Tp and apart also from the butt end Bt. Preferably, the intermediate partial layer is disposed at a position including a center position in the axis direction of the shaft. The sheet s7 is an intermediate partial hoop layer.

The shaft 6 is produced by a sheet winding method using the sheets shown in FIG. 2.

Hereinafter, a manufacturing process of the shaft 6 will be schematically described.

[Outline of Manufacturing Process of Shaft]

(1) Cutting Process

The prepreg sheet is cut into a desired shape in the cutting process. Each of the sheets shown in FIG. 2 is cut out by the process.

The cutting may be performed by a cutting machine, or may be manually performed. In the manual case, for example, a cutter knife is used.

(2) Stacking Process

A plurality of sheets is stacked in the stacking process, to produce a united sheet. Three united sheets are produced in the embodiment of FIG. 2. A first united sheet is a united sheet s12 formed by stacking the sheet s1 and the sheet s2. A second united sheet is a united sheet s34 formed by stacking the sheet s3 and the sheet s4. A third united sheet is a united sheet s67 formed by stacking the sheet s6 and the sheet s7.

In the stacking process, heating or a press may be used. More preferably, the heating and the press are used in combination. In a winding process to be described later, the deviation of the sheet may occur during the winding operation of the united sheet. The deviation reduces winding accuracy. The heating and the press improve an adhesive force between the sheets. The heating and the press suppress the deviation between the sheets in the winding process.

(3) Winding Process

A mandrel is prepared in the winding process. A typical mandrel is made of a metal. A mold release agent is applied to the mandrel. Furthermore, a resin having tackiness is applied to the mandrel. The resin is also referred to as a tacking resin. The cut sheet is wound around the mandrel. The tacking resin facilitates the application of the edge of the sheet to the mandrel.

The stacked sheets are wound in a state of the united sheet.

A winding body is obtained by the winding process. The winding body is obtained by wrapping the prepreg sheet around the outside of the mandrel. For example, the winding is performed by rolling the wound object on a plane. The winding may be performed by a manual operation or a machine. The machine is referred to as a rolling machine.

(4) Tape Wrapping Process

A tape is wrapped around the outer peripheral surface of the winding body in the tape wrapping process. The tape is also referred to as a wrapping tape. The wrapping tape is wrapped while tension is applied to the wrapping tape. A pressure is applied to the winding body by the wrapping tape. The pressure reduces voids.

(5) Curing Process

In the curing process, the winding body after performing the tape wrapping is heated. The heating cures the matrix resin. In the curing process, the matrix resin fluidizes temporarily. The fluidization of the matrix resin can discharge air between the sheets or in the sheet. The pressure (fastening force) of the wrapping tape accelerates the discharge of the air. The curing provides a cured laminate.

(6) Process of Extracting Mandrel and Process of Removing Wrapping Tape

The process of extracting the mandrel and the process of removing the wrapping tape are performed after the curing process. The order of the both processes is not restricted. However, the process of removing the wrapping tape is preferably performed after the process of extracting the mandrel in respect of improving the efficiency of the process of removing the wrapping tape.

(7) Process of Cutting Both Ends

The both end portions of the cured laminate are cut in the process. The cutting flattens the end face of the tip end Tp and the end face of the butt end Bt.

(8) Polishing Process

The surface of the cured laminate is polished in the process. Spiral unevenness left behind as the trace of the wrapping tape exists on the surface of the cured laminate. The polishing extinguishes the unevenness as the trace of the wrapping tape to flatten the surface of the cured laminate.

(9) Coating Process

The cured laminate after the polishing process is subjected to coating.

The shaft 6 is obtained in the processes. The head 4 and the grip 8 are attached to the shaft 6 thus manufactured to obtain the golf club 2.

In the present application, the term "a ratio of a center of gravity of a shaft" is used. As shown in FIG. 1, a shaft length is defined as Ls (mm), and a distance between the butt end Bt and a center of gravity G of the shaft is defined as Lg. The ratio (%) of the center of gravity of the shaft is $[(Lg/Ls) \times 100]$. Ls and Lg are measured along the axis direction.

A reference symbol G in FIG. 1 shows the center of gravity of the shaft 6. The center of gravity G is the center of gravity of the shaft 6 alone. The center of gravity G is located in the shaft. The center of gravity G is located on the shaft axis line.

A double pointed arrow Ls in FIG. 1 shows the shaft length (the unit is mm). The present invention is particularly effective in a shaft having a length of equal to or less than 991 mm. When the shaft is used for iron clubs, the length of the shaft of the present invention is set to a length suitable for each of the iron numbers. For example, in view of lengths of the clubs of a number 3 iron to a wedge, the shaft length Ls is preferably equal to or less than 980 mm, but preferably equal to or greater than 870 mm. In an iron set, flight distance is required for a middle iron and a long iron. The present invention that contributes to increase in flight distance is suitably used for a middle iron and a long iron. In this respect, the shaft length Ls is preferably equal to or greater than 900 mm, more preferably equal to or greater than 914 mm, still more preferably equal to or greater than 928 mm, and yet still more preferably equal to or greater than 942 mm.

When the distance Lg is short and the ratio of the center of gravity of the shaft is small, the center of gravity G of the shaft is close to the butt end Bt. This position of the center of gravity can cause a light swing balance and improve the easiness of swing. The position of the center of gravity can contribute to improvement in a head speed.

In respects of the easiness of swing and the head speed, the distance Lg is preferably equal to or less than 450 mm, more preferably equal to or less than 445 mm, and still more preferably equal to or less than 440 mm. In view of design restriction, the distance Lg is normally equal to or greater than 300 mm.

In respects of the easiness of swing and the head speed, the ratio of the center of gravity of the shaft is preferably equal to or less than 47%, more preferably equal to or less than 46%, and still more preferably equal to or less than 45%. In view of design restriction, the ratio of the center of gravity of the shaft is normally equal to or greater than 30%, and further, equal to or greater than 33%.

In light of the easiness of swing, a shaft weight obtained by a conversion calculation for 991 mm shaft length is preferably equal to or less than 75 g, more preferably equal to or less than 70 g, and still more preferably equal to or less than 68 g. In respects of strength and a degree of freedom in design, the shaft weight obtained by a conversion calculation for 991 mm shaft length is preferably equal to or greater than 40 g, more preferably equal to or greater than 45 g, and still more preferably equal to or greater than 50 g. If a shaft weight is defined as Ws (g) and the shaft length is defined as Ls (mm), the shaft weight obtained by a conversion calculation for 991 mm shaft length is calculated by [(Ws/Ls)×991].

In the present application, a flex point ratio C1(%) of the shaft is defined by the following formula (1).

$$C1=[F2/(F1+F2)]\times 100 \tag{1}$$

However, F1 represents the forward flex (mm), and F2 represents the backward flex (mm).

[Forward Flex F1]

Figure 3A:
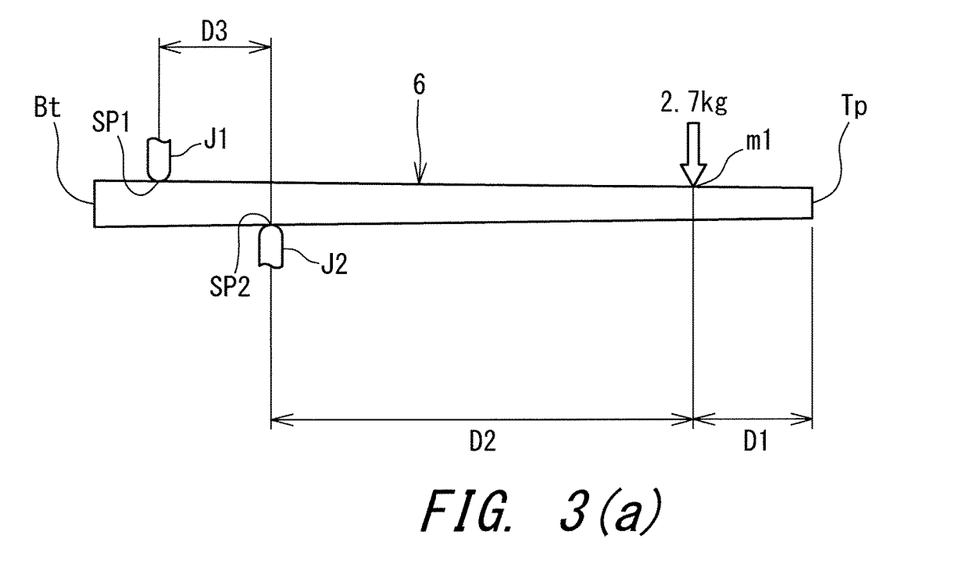
FIG. 3(a) shows a method for measuring a forward flex and FIG. 3(b) shows a method for measuring a backward flex.

FIG. 3(a) shows a method for measuring the forward flex F1. As shown in FIG. 3(a), a load point m1 is set at a position which is D1 mm away from the tip end Tp. A second supporting point SP2 is set at a position which is D2 mm away from the load point m1. Furthermore, a first supporting point SP1 is set at a position which is D3 mm away from the second supporting point SP2. A support J1 supporting the shaft 6 from the upside is provided at the first supporting point SP1. A support J2 supporting the shaft 6 from the underside is provided at the second supporting point SP2. In a state where no load is applied, the shaft axis line of the shaft 6 is substantially horizontal. At the load point m1, a load of 2.7 kg is allowed to act in a vertical downward direction. A travel distance (mm) of the load point m1 between the state where no load is applied and a state where a load is applied is determined as the forward flex F1. The travel distance is a travel distance along the vertical direction.

D1 is 64 mm, and D3 is 140 mm. When the shaft length is Ls (mm), D2 is [Ls−255] mm.

The section shape of a portion (hereinafter, referred to as an abutting portion) of the support J1 abutting on the shaft is as follows. The section shape of the abutting portion of the support J1 has convex roundness in a section parallel to the axis direction of the shaft. The curvature radius of the roundness is 15 mm. The section shape of the abutting portion of the support J1 has concave roundness in a section perpendicular to the axis direction of the shaft. The curvature radius of the concave roundness is 40 mm. The horizontal length (a length in a depth direction in FIG. 3(a)) of the abutting portion of the support J1 is 15 mm in the section perpendicular to the axis direction of the shaft. The section shape of the abutting portion of the support J2 is the same as that of the support J1. The section shape of the abutting portion of a load indenter (not shown) applying a load of 2.7 kg at the load point m1 has convex roundness in the section parallel to the axis direction of the shaft. The curvature radius of the roundness is 10 mm. The section shape of the abutting portion of a load indenter (not shown) applying a load of 2.7 kg at the load point m1 is a straight line in the section perpendicular to the axis direction of the shaft. The length of the straight line is 18 mm.

[Backward Flex F2]

Figure 3B:
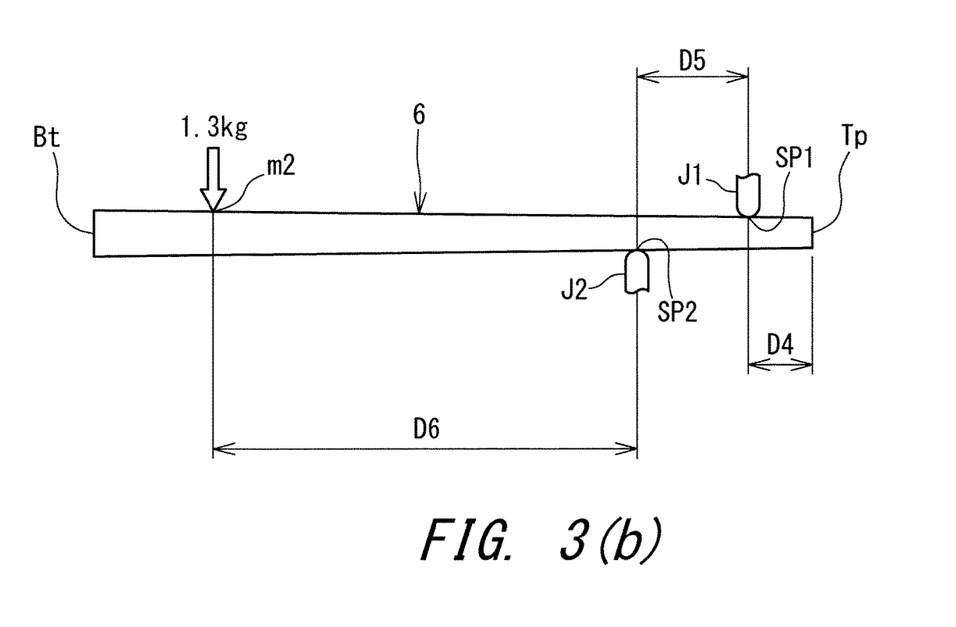

A method for measuring the backward flex is shown in FIG. 3(b). As shown in FIG. 3(b), a first supporting point SP1 is set at a position which is D4 mm away from the tip end Tp. Furthermore, a second supporting point SP2 is set at a position which is D5 mm away from the first supporting point SP1. A support J1 supporting the shaft 6 from the upside is provided at the first supporting point SP1. A support J2 supporting the shaft 6 from the underside is provided at the second supporting point SP2. In a state where no load is applied, the shaft axis line of the shaft 6 is substantially horizontal. At a load point m2 which is D6 mm away from the supporting point SP2, a load of 1.3 kg is allowed to act in the vertical downward direction. A travel distance (mm) of the load point m2 between the state where no load is applied and a state where a load is applied is determined as the backward flex F2. The travel distance is a travel distance along the vertical direction.

D4 is 12 mm, and D5 is 140 mm. When the shaft length is Ls (mm), D6 is [Ls−344] mm.

A shaft which has a small flex point ratio C1 has a great flexural rigidity at a tip portion thereof. That is, the tip portion is hard to bend. For this reason, the behavior of the head during a swing is stabilized to enhance directional stability of the hit ball. Further, the shaft having a small flex point ratio C1 has a small flexural rigidity at a butt portion thereof. That is, the butt portion is easy to bend. For this reason, the butt portion is bent in the initial phase of a downswing to cause "keeping" that has the same effect as cock. The head speed is enhanced by releasing the bending (keeping) at once immediately before the impact. The improvement of head speed increases the flight distance.

In respects of the directional stability and the flight distance, the flex point ratio C1 of the shaft is preferably equal to or less than 39%, more preferably equal to or less than 38%, and still more preferably equal to or less than 37%. In view of design restriction, the flex point ratio C1 of the shaft is normally equal to or greater than 30%.

In the present application, an outer diameter of the tip end Tp is defined as E1 (mm), and an outer diameter of the butt end Bt is defined as E2 (mm).

The tip portion of the shaft is a portion to which a head is attached, and on which a high stress acts in hitting. In view of deterioration in strength and rigidity, there is a tendency to avoid making the tip outer diameter E1 small.

On the other hand, in the shaft 6, the tip outer diameter E1 is made small. Furthermore, the butt outer diameter E2 is made great. This structure enables the center of gravity G of the shaft to be positioned closer to the butt end Bt, thus making the distance Lg small. As a result, the ratio of the center of gravity of the shaft can be small to improve easiness of swing.

In light of making the tip portion light to decrease the ratio of the center of gravity of the shaft, the tip outer diameter E1 is preferably small. In this respect, the tip outer diameter E1 is preferably equal to or less than 9.5 mm, more preferably equal to or less than 9.3 mm, and still more preferably equal to or less than 9.2 mm. In view of flexural rigidity of the tip portion, the tip outer diameter E1 is preferably equal to or greater than 8.0 mm, and still more preferably equal to or greater than 8.5 mm.

In light of decreasing the ratio of the center of gravity of the shaft, the butt outer diameter E2 is preferably great. In this respect, the butt outer diameter E2 is preferably equal to or greater than 15.3 mm, more preferably equal to or greater than 15.4 mm, still more preferably equal to or greater than 15.5 mm, and yet still more preferably equal to or greater than 15.6 mm. In view of flexural rigidity of the butt portion, the butt outer diameter E2 is preferably equal to or less than 18.0 mm, and more preferably equal to or less than 17.5 mm.

Enlargement of the butt outer diameter E2 contributes to weight reduction of the grip. This is because, under a condition in which outer diameters of grips are equal, as the outer diameter of the butt portion of the shaft is greater, the wall thickness of the grip can be made smaller. Weight reduction of the grip leads to weight reduction of the club to improve easiness of swing. As a result, the flight distance is increased.

On the other hand, there is a problem that the flex point ratio C1 of the shaft tends to become great by decreasing the tip outer diameter E1 and increasing the butt outer diameter E2. As is clear from the consideration of a cross sectional secondary moment, as the outer diameter becomes larger, flexural rigidity of the shaft tends to be higher. On the contrary, as the outer diameter becomes smaller, the flexural rigidity of the shaft tends to be lower. If the tip outer diameter E1 is small, the flexural rigidity of the tip portion deteriorates thereby to tend to increase the backward flex F2. If the butt outer diameter E2 is great, the flexural rigidity of the butt portion becomes high thereby to tend to decrease the forward flex F1. As a result, [F2/(F1+F2)] is increased. Then, it is difficult to make the flex point ratio C1 of the shaft small, and the above described effect cannot be obtained.

For this problem, a high-elastic tip-partial layer is used in the present embodiment. In FIG. 2, the sheet s9 is the high-elastic tip-partial layer having a fiber elastic modulus of equal to or greater than 30 ($t/mm^2$). The high-elastic tip-partial layer s9 improves the flexural rigidity of the tip portion and decreases the backward flex F2. As a result, the flex point ratio C1 of the shaft can be decreased.

In light of decreasing the flex point ratio C1 of the shaft, the fiber elastic modulus of the high-elastic tip-partial layer is preferably equal to or greater than 30 ($t/mm^2$), and more preferably equal to or greater than 33 ($t/mm^2$). In light of strength, the fiber elastic modulus of the high-elastic tip-partial layer is preferably equal to or less than 50 ($t/mm^2$), and more preferably equal to or less than 40 ($t/mm^2$).

Directional stability is improved by enhancing the rigidity of the tip portion. In addition, by enhancing the flexural rigidity of the tip portion, the backward flex F2 is reduced to decrease the flex point ratio C1 of the shaft. In these respects, an axis-directional length Ft (see FIG. 2) of the high-elastic tip-partial layer is preferably equal to or greater than 250 mm, more preferably equal to or greater than 300 mm, and still more preferably equal to or greater than 350 mm. If the high-elastic tip-partial layer is too long, the forward flex F1 is decreased, thus reducing the effect of making the flex point ratio C1 of the shaft small. In the respect, the axis-directional length Ft of the high-elastic tip-partial layer is preferably equal to or less than 600 mm, more preferably equal to or less than 550 mm, and still more preferably equal to or less than 500 mm.

In the present embodiment, butt partial bias layers are used. In FIG. 2, the sheet s3 and sheet s4 are the butt partial bias layers. The butt partial bias layers contribute to positioning the center of gravity G of the shaft closer to the butt end Bt and to lowering the ratio of the center of gravity of the shaft. In addition, the butt partial bias layers contribute to suppressing the increase of the flexural rigidity of the butt portion and to lowering the flex point ratio C1 of the shaft. Furthermore, the butt partial bias layers enhance the torsional rigidity at the grip portion to improve directional stability of the hit ball.

As described above, the shaft 6 of the present embodiment is excellent in directional stability because the flexural rigidity of the tip portion is high. However, more specifically, an extreme tip portion of the shaft 6 has a relatively small flexural rigidity, and a middle tip-vicinity portion that is adjacent to the extreme tip portion has a high flexural rigidity. By the structure, a high launch angle can be obtained while improving directional stability.

In the embodiment of FIG. 2, a grass giber reinforced layer s10 is adopted as the tip partial layer. A glass fiber has a low elastic modulus. The glass fiber reinforced layer s10 contributes to decrease in the flexural rigidity of the extreme tip portion of the shaft 6.

The extreme tip portion of the shaft 6 is a portion having a distance from the tip end Tp of less than 200 mm. The middle tip-vicinity portion is a portion having a distance from the tip end Tp of equal to or greater than 200 mm but equal to or less than 500 mm.

Since the middle tip-vicinity portion has a large outer diameter, the backward flex F2 is suppressed, and directional stability is enhanced. In this respect, the outer diameter of the shaft at a point 350 mm distant from the tip end Tp is preferably equal to or greater than 10.0 mm, more preferably equal to or greater than 10.1 mm, and still more preferably equal to or greater than 10.2 mm. A steep change of the outer diameter causes stress concentration and can deteriorate strength. In this respect, the outer diameter of the shaft at the point 350 mm distant from the tip end Tp is preferably equal to or less than 10.8 mm, and more preferably equal to or less than 10.7 mm.

In the present application, a flexural rigidity E1 at a point 130 mm distant from the tip end Tp is also referred to as E130. E130 serves as an index of the flexural rigidity of the extreme tip portion. In the present application, a flexural rigidity E1 at a point 430 mm distant from the tip end Tp is also referred to as E430. E430 serves as an index of the flexural rigidity of the middle tip-vicinity portion. In light of compatibility between directional stability and high launch angle, E430/E130 is preferably equal to or greater than 0.69, more preferably equal to or greater than 0.70, still more preferably equal to or greater than 0.72, and yet still more preferably equal to or greater than 0.75. In view of design restriction, E430/E130 is preferably equal to or less than 0.99, and more preferably equal to or less than 0.98. In light of directional stability, E430 is preferably equal to or greater than 1.8 (kgf·m$^2$), more preferably equal to or greater than 2.0 (kgf·m$^2$), and still more preferably equal to or greater than 2.2 (kgf·m$^2$). In view of design restriction, E430 is preferably equal to or less than 3.5 (kgf·m$^2$), and more preferably equal to or less than 3.3 (kgf·m$^2$).

Figure 4:
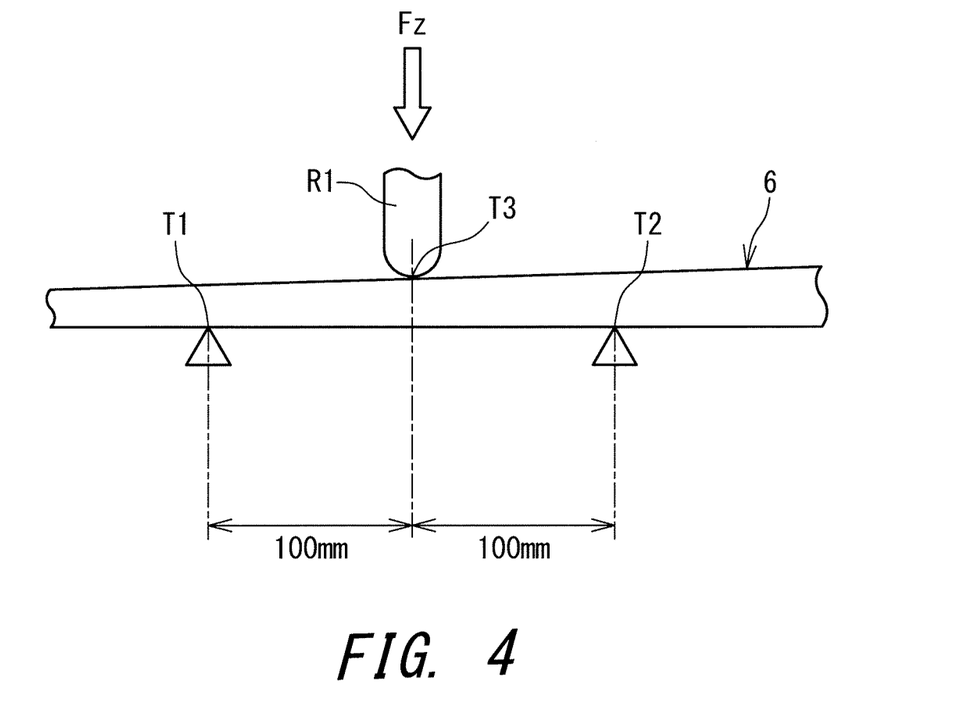
FIG. 4 shows a method for measuring a flexural rigidity EI.

FIG. 4 schematically shows a method for measuring the flexural rigidity EI. EI was measured using a universal material testing machine manufactured by INTESCO Co., Ltd., Type 2020 (maximum load: 500 kg). The shaft 6 is supported from beneath at a first support point T1 and a second support point T2. A load Fz was applied from above to a measurement point T3 while keeping the support. The direction of the load Fz is the vertically downward direction. The distance between the point T1 and the point T2 is 200 mm. The measurement point T3 is set to a position by which the distance between the point T1 and the point T2 is divided into two equal parts. A deflection amount H generated by applying the load Fz is measured. The load Fz is applied with an indenter R1. The tip of the indenter R1 is a cylindrical surface having a curvature radius of 5 mm. A downwardly moving speed of the indenter R1 is set to 5 mm/min. The moving of the indenter R1 is stopped when the load Fz reaches to 20 kgf (196 N), and the deflection amount H at the time is measured. The deflection amount H is an amount of displacement of the point T3 in the vertical direction. EI is calculated by the following formula.

$$EI(\text{kgf·m}^2) = Fz \times L^3 / (48 \times H)$$

In the formula, Fz represents the maximum load (kgf), L represents the distance between the support points (m), and H represents the deflection amount (m). The maximum load Fz is 20 kgf, and the distance L between the support points is 0.2 m.

As described above, in the present embodiment, the tip outer diameter E1 is decreased and the backward flex F2 is reduced. The flex point ratio of the shaft can be decreased while reducing the ratio of the center of gravity of the shaft by simultaneously achieving these contradictory specifications. In this respect, E1×F2 that is the product of the tip outer diameter E1 (mm) and the backward flex F2 (mm) is equal to or less than 600 mm$^2$, more preferably equal to or less than 580 mm$^2$, and still more preferably equal to or less than 550 mm$^2$. In view of design restriction, E1×F2 is preferably equal to or greater than 350 mm$^2$, more preferably equal to or greater than 370 mm$^2$, and still more preferably equal to or greater than 400 mm$^2$. This definition can be more preferably applied when the shaft length Ls is equal to or greater than 914 mm but equal to or less than 991 mm.

As described above, in the present embodiment, the butt outer diameter E2 is increased, and the forward flex F1 is increased. The flex point ratio of the shaft can be decreased while reducing the ratio of the center of gravity of the shaft by simultaneously achieving these contradictory specifications. In this respect, E2×F1 that is the product of the butt outer diameter E2 (mm) and the forward flex F1 (mm) is preferably equal to or greater than 1250 mm$^2$, more preferably equal to or greater than 1270 mm$^2$, still more preferably equal to or greater than 1300 mm$^2$, still more preferably equal to or greater than 1350 mm$^2$, still more preferably equal to or greater than 1400 mm$^2$, and yet still more preferably equal to or greater than 1450 mm$^2$. In view of design restriction, E2×F1 is preferably equal to or less than 1650 mm$^2$, more preferably equal to or less than 1630 mm$^2$, and yet still more preferably equal to or less than 1600 mm$^2$. This definition can be more preferably applied when the shaft length Ls is equal to or greater than 914 mm but equal to or less than 991 mm.

The embodiment of FIG. 2 includes a butt partial layer s5. The butt partial layer s5 is a glass fiber reinforced layer. A glass fiber has a low elastic modulus and a great specific gravity. Thus, the glass fiber reinforced butt partial layer s5 contributes to suppressing the flexural rigidity of the butt portion and to lowering the ratio of the center of gravity of the shaft.

The embodiment of FIG. 2 includes a middle partial hoop layer s7. In the shaft of FIG. 2, a plurality of butt partial reinforcing layers are used in order to lower the ratio of the center of gravity of the shaft. Furthermore, a plurality of tip partial reinforcing layers are used in order to lower the flex point ratio C1 of the shaft. As a result, the strength of a middle portion of the shaft is apt to relatively deteriorate. However, in the shaft of FIG. 2, the strength of the middle portion of the shaft is effectively enhanced by the middle partial hoop layer s7. The middle partial hoop layer s7 has an axis-directional length of preferably equal to or greater than 200 mm but equal to or less than 500 mm. The middle partial hoop layer s7 is preferably disposed on a position which includes a middle point of the shaft length Ls.

As shown in FIG. 2, the axis-directional range of the middle partial hoop layer s7 partially overlaps with the axis-directional range of the butt partial layers s3 and s4. Therefore, the middle partial hoop layer s7 is disposed on a position by which the flexural rigidity of the butt portion can be enhanced. However, the middle partial hoop layer s7 is a hoop layer and therefore hardly contributes to flexural rigidity. Using the middle partial hoop layer s7 secures bending at the middle portion adjacent to the butt portion of the shaft, and therefore the effect of improvement in head speed because of the lowered flex point ratio C1 of the shaft is maintained.

In the embodiment of FIG. 2, the tip partial layer includes a glass fiber reinforced layer s10. The glass fiber enhances impact absorbing energy to contribute to improvement of practical strength. The weight of the grass fiber reinforced layer s10 that is the tip partial layer is smaller than the weight of the glass fiber reinforced layer s5 that is the butt partial layer. Therefore, the ratio of the center of gravity of the shaft is small.

Examples of methods for adjusting the flex point ratio C1 of the shaft and the ratio of the center of gravity of the shaft include (a1) to (a10) below.

(a1) Increasing or decreasing the number of the winding of the butt partial layer.

(a2) Increasing or decreasing the thickness of the butt partial layer.

(a3) Increasing or decreasing the axis-directional length of the butt partial layer.

(a4) Increasing or decreasing the axis-directional length of the butt partial layer.

(a5) Increasing or decreasing the number of the winding of the tip partial layer.

(a6) Increasing or decreasing the thickness of the tip partial layer.

(a7) Increasing or decreasing the axis-directional length of the tip partial layer.

(a8) Increasing or decreasing the taper ratio of the shaft (increasing or decreasing the taper ratio of the mandrel).

(a9) Changing the distribution of the outer diameter of the mandrel.

(a10) Increasing or decreasing the fiber elastic modulus of all the layers.

Furthermore, the flex point ratio C1 of the shaft and the ratio of the center of gravity of the shaft can be adjusted by changing prepregs in all the layers. Below Tables 1 and 2 show examples of prepregs usable for the shaft according to the present invention.

TABLE 1

Examples of utilizable prepregs

| | | | | | | Physical property value of reinforcement fiber | |
|---|---|---|---|---|---|---|---|
| Manufacturer | Trade name | Thickness of sheet (mm) | Fiber content (% by weight) | Resin content (% by weight) | Part number of fiber | Tensile elastic modulus ($t/mm^2$) | Tensile strength ($kgf/mm^2$) |
| Toray Industries, Inc. | 3255S-10 | 0.082 | 76 | 24 | T700S | 24 | 500 |
| Toray Industries, Inc. | 3255S-12 | 0.103 | 76 | 24 | T700S | 24 | 500 |
| Toray Industries, Inc. | 3255S-15 | 0.123 | 76 | 24 | T700S | 24 | 500 |
| Toray Industries, Inc. | 2255S-10 | 0.082 | 76 | 24 | T800S | 30 | 600 |
| Toray Industries, Inc. | 2255S-12 | 0.102 | 76 | 24 | T800S | 30 | 600 |
| Toray Industries, Inc. | 2255S-15 | 0.123 | 76 | 24 | T800S | 30 | 600 |
| Toray Industries, Inc. | 2256S-10 | 0.077 | 80 | 20 | T800S | 30 | 600 |
| Toray Industries, Inc. | 2256S-12 | 0.103 | 80 | 20 | T800S | 30 | 600 |
| Toray Industries, Inc. | 2276S-10 | 0.077 | 80 | 20 | T800S | 30 | 600 |
| Toray Industries, Inc. | 805S-3 | 0.034 | 60 | 40 | M30S | 30 | 560 |
| Toray Industries, Inc. | 8053S-3 | 0.028 | 70 | 30 | M30S | 30 | 560 |
| Toray Industries, Inc. | 9255S-7A | 0.056 | 78 | 22 | M40S | 40 | 470 |
| Toray Industries, Inc. | 9255S-6A | 0.047 | 76 | 24 | M40S | 40 | 470 |
| Toray Industries, Inc. | 925AS-4C | 0.038 | 65 | 35 | M40S | 40 | 470 |
| Toray Industries, Inc. | 9053S-4 | 0.027 | 70 | 30 | M40S | 40 | 470 |
| Toray Industries, Inc. | 17045G-10 | 0.082 | 76 | 24 | T1100G | 33 | 675 |
| Nippon Graphite Fiber Corporation | E1026A-09N | 0.100 | 63 | 37 | XN-10 | 10 | 190 |
| Nippon Graphite Fiber Corporation | E1026A-14N | 0.150 | 63 | 37 | XN-10 | 10 | 190 |

The tensile strength and the tensile elastic modulus are measured in accordance with "Testing Method for Carbon Fibers" JIS R7601:1986.

TABLE 2

Examples of utilizable prepregs

| | | | | | | Physical property value of reinforcement fiber | |
|---|---|---|---|---|---|---|---|
| Manufacturer | Trade name | Thickness of sheet (mm) | Fiber content (% by weight) | Resin content (% by weight) | Part number of fiber | Tensile elastic modulus ($t/mm^2$) | Tensile strength ($kgf/mm^2$) |
| Mitsubishi Rayon Co., Ltd. | GE352H-160S | 0.150 | 65 | 35 | E glass | 7 | 320 |
| Mitsubishi Rayon Co., Ltd. | TR350C-100S | 0.083 | 75 | 25 | TR50S | 24 | 500 |

TABLE 2-continued

Examples of utilizable prepregs

| Manufacturer | Trade name | Thickness of sheet (mm) | Fiber content (% by weight) | Resin content (% by weight) | Part number of fiber | Physical property value of reinforcement fiber | |
|---|---|---|---|---|---|---|---|
| | | | | | | Tensile elastic modulus (t/mm$^2$) | Tensile strength (kgf/mm$^2$) |
| Mitsubishi Rayon Co., Ltd. | TR350U-100S | 0.078 | 75 | 25 | TR50S | 24 | 500 |
| Mitsubishi Rayon Co., Ltd. | TR350C-125S | 0.104 | 75 | 25 | TR50S | 24 | 500 |
| Mitsubishi Rayon Co., Ltd. | TR350C-150S | 0.124 | 75 | 25 | TR50S | 24 | 500 |
| Mitsubishi Rayon Co., Ltd. | TR350C-175S | 0.147 | 75 | 25 | TR50S | 24 | 500 |
| Mitsubishi Rayon Co., Ltd. | MR350J-025S | 0.034 | 63 | 37 | MR40 | 30 | 450 |
| Mitsubishi Rayon Co., Ltd. | MR350J-050S | 0.058 | 63 | 37 | MR40 | 30 | 450 |
| Mitsubishi Rayon Co., Ltd. | MR350C-050S | 0.05 | 75 | 25 | MR40 | 30 | 450 |
| Mitsubishi Rayon Co., Ltd. | MR350C-075S | 0.063 | 75 | 25 | MR40 | 30 | 450 |
| Mitsubishi Rayon Co., Ltd. | MRX350C-075R | 0.063 | 75 | 25 | MR40 | 30 | 450 |
| Mitsubishi Rayon Co., Ltd. | MRX350C-100S | 0.085 | 75 | 25 | MR40 | 30 | 450 |
| Mitsubishi Rayon Co., Ltd. | MR350C-100S | 0.085 | 75 | 25 | MR40 | 30 | 450 |
| Mitsubishi Rayon Co., Ltd. | MRX350C-125S | 0.105 | 75 | 25 | MR40 | 30 | 450 |
| Mitsubishi Rayon Co., Ltd. | MR350C-125S | 0.105 | 75 | 25 | MR40 | 30 | 450 |
| Mitsubishi Rayon Co., Ltd. | MR350E-100S | 0.093 | 70 | 30 | MR40 | 30 | 450 |
| Mitsubishi Rayon Co., Ltd. | HRX350C-075S | 0.057 | 75 | 25 | HR40 | 40 | 450 |
| Mitsubishi Rayon Co., Ltd. | HRX350C-110S | 0.082 | 75 | 25 | HR40 | 40 | 450 |

The tensile strength and the tensile elastic modulus are measured in accordance with "Testing Method for Carbon Fibers" JIS R7601:1986.

EXAMPLES

Hereinafter, the effects of the present invention will be clarified by examples. However, the present invention should not be interpreted in a limited way based on the description of examples.

Example 1

A shaft of Example 1 was produced based on the laminated constitution shown in FIG. 2. The manufacturing process was the same as that of the shaft 6. The number of winding, the thickness of the prepreg, the fiber content of the prepreg, the tensile elastic modulus of the fiber and the like were appropriately selected for all the sheets. Prepregs used for Example 1 are as follows.
Sheet s1: MRX350C-125S
Sheet s2: MRX350C-125S
Sheet s3: TR355C-100S
Sheet s4: TR355C-100S
Sheet s5: GE352H-160S
Sheet s6: TR350C-150S
Sheet s7: MRX350C-075R
Sheet s8: MRX350C-100S
Sheet s9: MRAG22C-100S
Sheet s10: GE352H-160S
Sheet s11: MRX350C-100S
Sheet s12: MRX350C-100S In the shaft of Example 1, the sheet s5 was a butt partial layer reinforced by a glass fiber, the sheet s9 "MRAG22C-100S" was a high-elastic tip-partial layer (having a fiber elastic modulus of 33 t/mm$^2$), the sheet s10 was a tip partial layer reinforced by a glass fiber. The axis-directional length of the high-elastic tip-partial layer s9 was 450 mm.

A head of number 5 iron and a grip were attached to the shaft to obtain a golf club of Example 1. As the head, the number 5 iron of the trade name "XXIO 9" manufactured by DUNLOP SPORTS CO. LTD was adopted. The length of the shaft was 943 mm.

Examples 2 to 5 and Comparative Examples 1 to 3

Shafts and clubs of Examples 2 to 5 and Comparative Examples 1 to 3 ware obtained in the same manner as in Example 1 except that specifications shown in below Tables 3 were adopted by using the above described methods for adjusting. In Example 5 and Comparative Examples 1 to 3, a prepreg having a fiber elastic modulus of 24 t/mm$^2$ was used instead of the high-elastic tip-partial layer.

Specifications and results of evaluations for Examples 1 to 5 and Comparative Examples 1 to 3 are shown in Table 3 below.

TABLE 3

Specifications and results of evaluations for Examples and Comparative Examples

| | Ex. 1 | Ex. 2 | Ex.3 | Ex. 4 | Ex. 5 | Comp. Ex. 1 | Comp. Ex. 2 | Comp. Ex. 3 |
|---|---|---|---|---|---|---|---|---|
| Shaft weight WS (g) | 69 | 69 | 69 | 69 | 69 | 69 | 69 | 69 |
| Shaft weight obtained by a conversion calculation for 991 mm shaft length | 69.0 | 70.3 | 70.9 | 69.8 | 72.5 | 69.8 | 70.3 | 69.2 |
| Shaft length Ls (mm) | 991 | 973 | 965 | 980 | 943 | 979 | 972 | 988 |
| Ratio of the center of gravity of the shaft (%) | 44.6 | 43.8 | 45.5 | 46.7 | 43.0 | 48.5 | 46.5 | 50.1 |
| Flex point ratio C1 of the shaft | 35.9 | 36.8 | 33.1 | 33.8 | 38.7 | 38.0 | 41.9 | 41.3 |
| Tip outer diameter E1 (mm) | 9.3 | 9.2 | 9.5 | 9.2 | 9.2 | 9.5 | 9.2 | 10.0 |
| Butt outer diameter E2 (mm) | 15.6 | 15.6 | 15.6 | 15.2 | 15.7 | 15.2 | 15.0 | 14.5 |
| Forward flex F1 (mm) | 98 | 98 | 97 | 102 | 95 | 103 | 90 | 88 |
| Backward flex F2 (mm) | 55 | 57 | 48 | 52 | 60 | 63 | 65 | 62 |
| E1 × F2 (mm$^2$) | 512 | 524 | 456 | 478 | 552 | 599 | 598 | 620 |
| E2 × F1 (mm$^2$) | 1529 | 1529 | 1513 | 1550 | 1492 | 1566 | 1350 | 1276 |
| E130 (kgf · m$^2$) | 2.80 | 2.60 | 3.05 | 2.91 | 2.44 | 2.41 | 2.22 | 2.60 |
| E430 (kgf · m$^2$) | 2.66 | 2.00 | 2.81 | 2.60 | 1.72 | 1.56 | 1.32 | 1.78 |
| E430/E130 | 0.95 | 0.77 | 0.92 | 0.89 | 0.70 | 0.65 | 0.59 | 0.68 |
| Existence or non-existence of high-elastic tip-partial layer | Exist | Exist | Exist | Exist | Exist | Not Exist | Not Exist | Not Exist |
| Fiber elastic modulus of high-elastic tip-partial layer (t/mm$^2$) | 33 | 33 | 46 | 40 | 30 | — | — | — |
| Flight distance (yard) | 165.3 | 167.7 | 159.7 | 157.2 | 167.3 | 147.7 | 150.2 | 143.9 |
| Lateral deviation amount (yard) | 10.7 | 9.5 | 5.6 | 7.2 | 17.9 | 19.4 | 24.8 | 21.1 |

[Evaluation Methods]

[Flight Distance]

Ten golf players performed actual hitting test. The ten golf players hit balls five times to measure the flight distances. The average values of these hitting data of fifty times in total are shown in the above Table 3. The flight distance is a total flight distance including run.

[Lateral Deviation Amount]

In the actual hitting test, lateral deviation amounts were measured together with the flight distances. The lateral deviation amount is deviation from the target direction. The deviation amount is a distance between a straight line connecting a hit ball point to a target point and a hit ball reaching point. The deviation amount is a plus value in both cases where the ball is deviated to both a right side and a left side. The average values of the 50 data are shown in Table 3. The less the lateral deviation amount is, the higher the directional stability is.

As shown in these Tables, the advantages of the present invention are apparent.

The shafts described above can be applied to all golf clubs such as iron type, hybrid type, and wood type.

The description hereinabove is merely for an illustrative example, and various modifications can be made in the scope not to depart from the principles of the present invention.

What is claimed is:

1. A golf club shaft comprising a plurality of fiber reinforced layers, a tip end and a butt end, a shaft length is defined as Ls, a distance between the butt end of the shaft and a center of gravity of the shaft is defined as Lg, and a ratio of the distance Lg to the shaft length Ls is defined as a ratio of the center of gravity of the shaft, the ratio of the center of gravity of the shaft is equal to or less than 47%, the shaft length Ls is equal to or less than 991 mm, a forward flex is defined as F1 (mm) and a backward flex is defined as F2 (mm), a flex point ratio C1 of the shaft calculated by the following formula (1) is equal to or less than 39%:

$$C1 = [F2/(F1+F2)] \times 100 \qquad (1),$$

wherein the fiber reinforced layers include a tip partial layer, the tip partial layer includes a high-elastic tip-partial layer having a fiber elastic modulus of equal to or greater than 33 (t/mm$^2$), and the high-elastic tip-partial layer is a straight layer.

2. The golf club shaft according to claim 1, a shaft weight obtained by a conversion calculation for 991 mm shaft length is equal to or less than 75 g.

3. The golf club shaft according to claim 2, wherein the shaft has a weight defined as Ws (g) and the shaft length is defined as Ls (mm), the shaft weight obtained by a conversion calculation for 991 mm shaft length is calculated by [(Ws/Ls)×991].

4. The golf club shaft according to claim 1, wherein an outer diameter E1 of the tip end is equal to or less than 9.5 mm, and an outer diameter E2 of the butt end is equal to or greater than 15.3 mm.

5. The golf club shaft according to claim 1, wherein the shaft length Ls is equal to or greater than 914 mm but equal to or less than 991 mm, and an outer diameter of the tip end is defined as E1 (mm), E1×F2 is equal to or less than 580 mm$^2$.

6. The golf club shaft according to claim 1, wherein the shaft length Ls is equal to or greater than 914 mm but equal to or less than 991 mm, and an outer diameter of the butt end is defined as E2 (mm), E2×F1 is equal to or greater than 1300 mm$^2$.

7. The golf club shaft according to claim 1, wherein the high-elastic tip-partial layer has an axis-directional length of equal to or greater than 250 mm but equal to or less than 600 mm.

8. The golf club shaft according to claim 1, wherein an outer diameter of the shaft at a point 350 mm distant from the tip end is equal to or greater than 10.0 mm but equal to or less than 10.8 mm.

9. The golf club shaft according to claim 1, wherein a flexural rigidity EI at a point 130 mm distant from the tip end is defined as E130, and a flexural rigidity EI at a point 430 mm distant from the tip end is defined as E430, E430/E130 is equal to or greater than 0.69 but equal to or less than 0.99.

10. The golf club shaft according to claim 1, wherein a flex point ratio C1 of the shaft is equal to or less than 38%.

11. The golf club shaft according to claim 1, wherein a flex point ratio C1 of the shaft is equal to or less than 37%.

* * * * *